(12) United States Patent
Lagnado et al.

(10) Patent No.: US 11,115,841 B2
(45) Date of Patent: Sep. 7, 2021

(54) IDENTIFIERS FOR NETWORK DEVICES

(71) Applicant: HEWLETT-PACKARD DEVELOPMENT COMPANY, L.P., Houston, TX (US)

(72) Inventors: Isaac Lagnado, Houston, TX (US); Danny Farnyih Meng, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 207 days.

(21) Appl. No.: 16/306,163

(22) PCT Filed: Sep. 28, 2016

(86) PCT No.: PCT/US2016/054054
§ 371 (c)(1),
(2) Date: Nov. 30, 2018

(87) PCT Pub. No.: WO2018/063172
PCT Pub. Date: Apr. 5, 2018

(65) Prior Publication Data
US 2020/0329385 A1    Oct. 15, 2020

(51) Int. Cl.
*H04W 24/04*    (2009.01)
*H04W 8/26*    (2009.01)
(Continued)

(52) U.S. Cl.
CPC ............ *H04W 24/04* (2013.01); *H04W 8/26* (2013.01); *H04W 48/10* (2013.01); *H04W 48/16* (2013.01); *H04W 48/20* (2013.01)

(58) Field of Classification Search
CPC .......... H04B 7/18532; H04L 12/4625; H04W 24/04; H04W 8/26; H04W 48/10; H04W 48/16; H04W 48/20
See application file for complete search history.

(56) References Cited

U.S. PATENT DOCUMENTS 8,315,626 B2 * 11/2012 Huotari ................. H04W 48/20
                                                   455/435.2
8,837,339 B2     9/2014 Sakai
(Continued)

FOREIGN PATENT DOCUMENTS

WO    WO-2016001620 A1    1/2016
WO    WO-2016014180 A1    1/2016

OTHER PUBLICATIONS

Non-broadcast Wireless SSIDsWhy Hidden Wireless Networks Are a Bad Idea, Feb. 8, 2008.

*Primary Examiner* — Benjamin H Elliott, IV
(74) *Attorney, Agent, or Firm* — HPI Patent Department

(57) ABSTRACT

Examples disclosed herein provide the ability to handle situations that may arise when error conditions exist for a networking device. In one example method at a client device, the client device scans for a first identifier associated with the networking device and, upon finding the first identifier, connects to the networking device. As an example, the client device disconnects from the networking device if an error condition exists for the networking device. As an example, if the error condition exists, the client device decreases a priority of the networking device relative to other networking devices for subsequent scans.

10 Claims, 4 Drawing Sheets

(51) Int. Cl.
*H04W 48/10* (2009.01)
*H04W 48/16* (2009.01)
*H04W 48/20* (2009.01)

(56) References Cited

U.S. PATENT DOCUMENTS

| | | | |
|---|---|---|---|
| 9,125,024 B2* | 9/2015 | Hua | G06Q 30/0241 |
| 2008/0261584 A1 | 10/2008 | Qi et al. | |
| 2009/0168736 A1* | 7/2009 | Itagaki | H04W 76/14 |
| | | | 370/338 |
| 2010/0309815 A1* | 12/2010 | Yepez | H04L 12/4625 |
| | | | 370/254 |
| 2011/0231559 A1* | 9/2011 | Yamaguchi | H04W 48/20 |
| | | | 709/228 |
| 2012/0086552 A1* | 4/2012 | Fast | G01S 5/0018 |
| | | | 340/8.1 |
| 2012/0172083 A1* | 7/2012 | Logalbo | H04W 8/186 |
| | | | 455/525 |
| 2014/0105172 A1* | 4/2014 | Daum | H04L 5/0082 |
| | | | 370/330 |
| 2017/0041860 A1* | 2/2017 | Ogawa | H04W 48/16 |
| 2017/0141954 A1* | 5/2017 | Stevens | H04L 41/069 |
| 2020/0329385 A1* | 10/2020 | Lagnado | H04W 48/16 |

* cited by examiner

IDENTIFIERS FOR NETWORK DEVICES

BACKGROUND

A wireless network is any type of computer network that uses wireless data connections for connecting network nodes. The technology provided by wireless networks allows for the sharing of networking devices or services wirelessly rather than via a wired connection, such as printers, scanners, and high-speed Internet connections. A wireless network provides users the ability to move around within the wireless network coverage area and yet still be connected to the wireless network and utilize its services (e.g., wireless printing, high-speed Internet connection).

DETAILED DESCRIPTION

An example of a networking device that can provide wireless services includes a wireless access point (WAP) providing, as an example, a high-speed Internet connection. Prior to wireless networks, setting up a computer network in a business, home or school often required running many cables through walls and ceilings in order to deliver network access to all of the network-enabled devices in the building. With the creation of the WAP, network users are now able to add devices that access the network with few or no cables. A WAP normally connects directly to a wired Ethernet connection and the WAP then provides wireless connections using radio frequency links for other devices to utilize that wired connection, such as a high-speed Internet connection. Most WAPs support the connection of multiple wireless devices to one wired connection. Examples of other networking devices that can provide wireless services include, but are not limited to, printers, cameras, and network-attached storage.

Examples disclosed herein provide the ability to handle situations that may arise when error conditions exist for a networking device. As an example, with regards to a WAP, the WAP may monitor the status/health of wireless services offered by the WAP, such as an Internet connection. If the WAP determines there is an obstruction or significant degradation of the wireless services offered by the WAP, such as the Internet connection not being available, the WAP may take corrective actions to avoid a client device of the WAP from having an unsatisfactory experience, as will be further described. Similarly, the client device, in place of or in addition to the corrective actions performed by the WAP, may perform corrective actions on its end to have an improved wireless connection with networking devices, such as the WAP.

Figure 1:
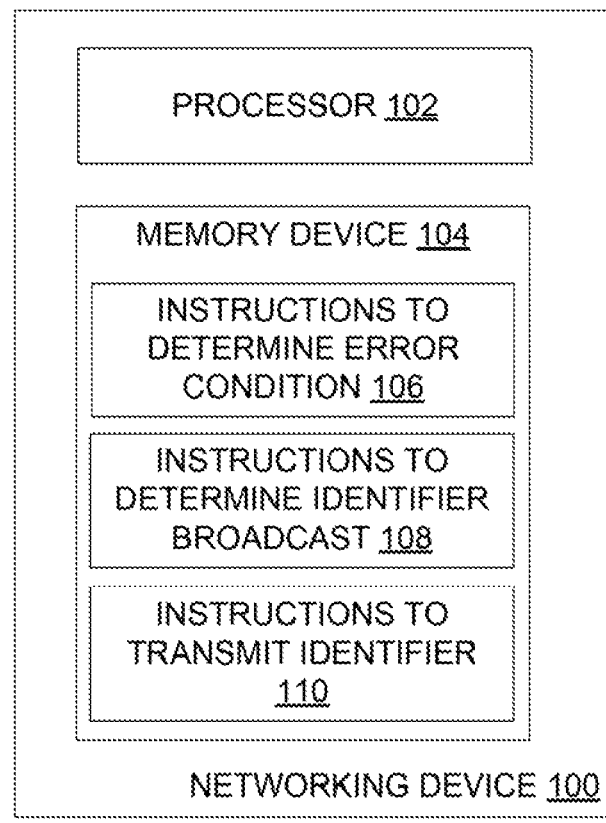
FIG. 1 illustrates a networking device for handling error conditions, according to an example.

With reference to the figures, FIG. 1 illustrates a networking device 100 for handling error conditions, according to an example. As described above, the networking device 100 may correspond to a WAP that offers an Internet connection, a printer that offers wireless printing, a camera for wirelessly capturing images, or a network-attached storage for offering wireless backup, among others.

The networking device 100 depicts a processor 102 and a memory device 104 and, as an example of the networking device 100 performing its operations, the memory device 104 may include instructions 106-110 that are executable by the processor 102. Thus, memory device 104 can be said to store program instructions that, when executed by processor 102, implement the components of the networking device 100. The executable program instructions stored in the memory device 104 include, as an example, instructions to determine error condition (106), instructions to determine identifier broadcast (108), and instructions to transmit identifier (110).

Instructions to determine error condition (106) represent program instructions that when executed by the processor 102 cause the networking device 100 to determine whether an error condition exists for the networking device 100. Examples of error conditions that may arise for networking device 100 include, but are not limited to, an Internet connection not being available at a WAP (e.g., due to a network outage), a printer being low on ink or out of paper, or a networking device, such as the network-attached storage, being low on storage space. As an example, with regards to a WAP, the WAP may monitor the status/health of wireless services offered by the WAP, such as an Internet connection. If the WAP determines there is an obstruction or significant degradation of the wireless services offered by the WAP, such as the Internet connection not being available, the WAP may determine that an error condition exists for the WAP.

Instructions to determine identifier broadcast (108) represent program instructions that when executed by the processor 102 cause the networking device 100 to determine whether to broadcast an identifier associated with the networking device 100, based on whether any error conditions exists. The identifier associated with the networking device 100 may vary. As an example, the identifier may correspond to a service set identifier (SSID) of the networking device 100. For example, if a client device desires to access the Internet connection that may be provided by a WAP, the client device may join the SSID broadcast by the WAP. Similarly, if the client device desires to wirelessly print a document to a printer, the client device may select the SSID broadcast by the wireless printer. As another example of an identifier associated with the networking device 100, the identifier may correspond to the media access control (MAC) address of the networking device 100, which is unique for each networking device in a service area of the client device.

As an example, if the networking device 100 determines that an error condition exists, as described above, the networking device 100 may determine not to broadcast the identifier. For example, rather than the networking device 100 broadcasting the identifier, and a client device accessing the networking device 100 via the identifier, then coming to know about the error condition, the networking device 100 instead may determine not to broadcast the identifier, allowing for the client device to access another networking device that may not be experiencing an error condition. However, once the networking device 100 is no longer experiencing the error condition, the networking device 100 may resume broadcasting its identifier. This may provide a more positive experience for the client device, allowing for the client device to choose from networking devices that are not experiencing error conditions.

Instructions to transmit identifier (110) represent program instructions that when executed by the processor 102 cause the networking device 100, upon determining to broadcast its identifier, to transmit, in a beacon, the identifier associated with the networking device 100. However, if an error condition exists at the networking device 100, the identifier transmitted in the beacon may include a code corresponding to the error condition concatenated to a unique identifier associated with the networking device 100, such as the SSID. Similarly, if no error conditions exist at the networking device 100, or if the networking device 100 is no longer experiencing any error conditions, as described above, the identifier transmitted in the beacon may not include any codes concatenated to the unique identifier associated with the networking device 100, but only the unique identifier itself.

As an example, if no error conditions exist, the networking device 100 may transmit, in the beacon, the identifier "CurrentSSID", so that client devices have the ability to access networking device 100, if they so choose. However, if an error condition exists at the networking device 100, the networking device 100 may transmit, in the beacon, the identifier "CurrentSSID_Error", where "Error" corresponds to the particular error condition that the networking condition is experiencing. For example, if a WAP is experiencing issues with providing an Internet connection, the WAP may transmit the identifier "CurrentSSID_NoInternet". Similarly, if a wireless printer is low on ink or out of paper, the printer may transmit the identifier "CurrentSSID_LowInk" or "CurrentSSID_NoPaper", respectively. As a result, a client device, when attempting to connect to the networking device 100, rather than finding "CurrentSSID" will find "CurrentSSID_Error". With this information, the client device may be able to take corrective action to resolve the error condition at the networking device 100 (e.g., replacing ink cartridge or adding paper) or find another networking device (e.g., another networking device that offers an Internet connection).

As an example, rather than changing the identifier of the networking device 100 based on whether an error condition exists, the networking device 100 may transmit the same identifier, regardless of whether error conditions exist. However, once a client device connects to the networking device 100, once the networking device 100 receives a request from the client device (e.g., attempting to access the Internet connection offered by the networking device 100), the networking device 100 may provide to the client device a description of an error condition, if it exists (e.g., no Internet connection available). For example, if the client device attempts to access a webpage via an Internet browser, the networking device 100 may provide an error page instead, informing the client device that an Internet connection is not available (e.g., "This Access Point is not currently connected to the Internet"). As a result, the client device may then connect to another networking device.

Memory device 104 represents generally any number of memory components capable of storing instructions that can be executed by processor 102. Memory device 104 is non-transitory in the sense that it does not encompass a transitory signal but instead is made up of at least one memory component configured to store the relevant instructions. As a result, the memory device 104 may be a non-transitory computer-readable storage medium. Memory device 104 may be implemented in a single device or distributed across devices. Likewise, processor 102 represents any number of processors capable of executing instructions stored by memory device 104. Processor 102 may be integrated in a single device or distributed across devices. Further, memory device 104 may be fully or partially integrated in the same device as processor 102, or it may be separate but accessible to that device and processor 102.

In one example, the program instructions 106-110 can be part of an installation package that when installed can be executed by processor 102 to implement the components of the networking device 100. In this case, memory device 104 may be a portable medium such as a CD, DVD, or flash drive or a memory maintained by a server from which the installation package can be downloaded and installed. In another example, the program instructions may be part of an application or applications already installed. Here, memory device 104 can include integrated memory such as a hard drive, solid state drive, or the like.

Figure 2:
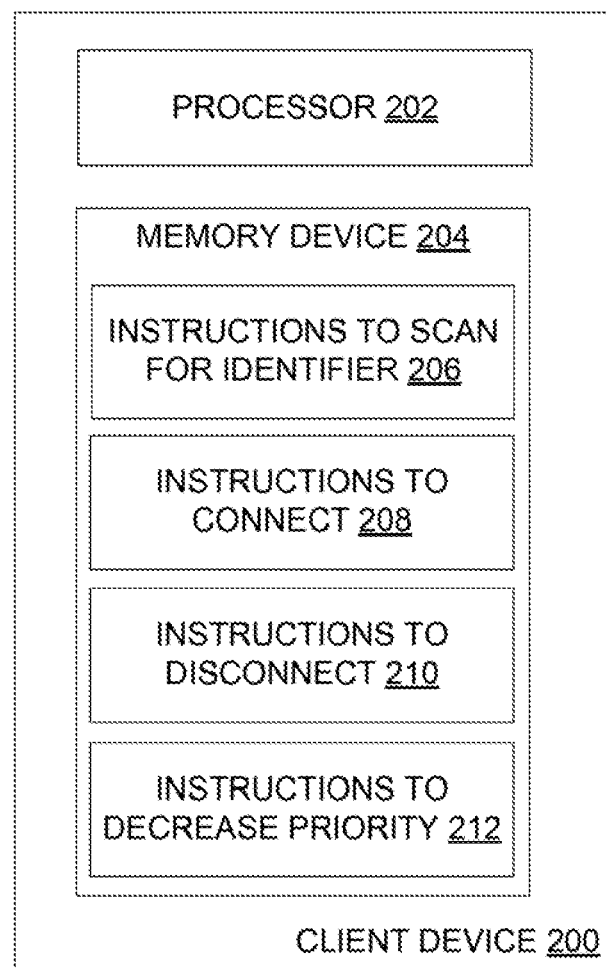
FIG. 2 illustrates a client device for handling error conditions at a networking device, according to an example.

FIG. 2 illustrates a client device 200 for handling error conditions at a networking device, according to an example. As will be further described, the client device 200, in place of or in addition to the corrective actions performed by the networking device 100, may perform corrective actions on its end to have an improved wireless connection with networking devices.

Similar to the processor 102 and memory device 104 of networking device 100, the client device 200 depicts a processor 202 and a memory device 204 and, as an example of the client device 200 performing its operations, the memory device 204 may include instructions 206-212 that are executable by the processor 202. Thus, memory device 204 can be said to store program instructions that, when executed by processor 202, implement the components of the client device 200. The executable program instructions stored in the memory device 204 include, as an example, instructions to scan for identifier (206), instructions to connect (208), instructions to disconnect (210), and instructions to decrease priority (212).

Instructions to scan for identifier (206) represent program instructions that when executed by the processor 202 cause the client device 200 to scan for a first identifier associated with a networking device. As an example, the first identifier may correspond to an SSID of the networking device. For example, if the client device 200 desires to access the Internet connection that may be provided by a WAP, the client device 200 may join the SSID broadcast by the WAP. Similarly, if the client device 200 desires to wirelessly print a document to a printer, the client device 200 may select the SSID broadcast by the wireless printer. As another example of an identifier associated with the networking device, the first identifier may correspond to the MAC address of the networking device, which is unique for each networking device in a service area of the client device 200.

Instructions to connect (208) represent program instructions that when executed by the processor 202 cause the client device 200, upon finding the first identifier, to connect to the networking device. As described above, the networking device may transmit, in a beacon, the first identifier associated with the networking device. Upon the client device 200 detecting the first identifier transmitted by the networking device, the client device 200 and the networking device may initiate communications with each other.

Instructions to disconnect (210) represent program instructions that when executed by the processor 202 cause the client device 200 to disconnect from the networking device if an error condition exists for the networking device. Detection of the error condition for the networking device may vary. For example, as described above, once the client device 200 finds the first identifier and connects to the networking device, and the networking device does not provide the service being requested by client device 200 (e.g., attempting to access the Internet connection offered by the networking device), the client device 200 may determine on its own that an error condition exists.

Yet another example, as described above, once the client device 200 finds the first identifier and connects to the networking device, and the networking device receives a request from the client device 200 (e.g., attempting to access the Internet connection offered by the networking device), the networking device may provide to the client device 200 a description of an error condition, if it exists (e.g., no Internet connection available). For example, if the client device 200 attempts to access a webpage via an Internet browser, the networking device may provide an error page instead, informing the client device 200 that an Internet connection is not available (e.g., "This Access Point is not currently connected to the Internet").

As another example of the client device 200 determining whether an error condition exists for the networking device, if the first identifier is not found during the scan, the client device 200 may determine whether the first identifier is flagged for an error condition. As an example, the first identifier may be flagged for an error condition if the client device 200 finds a second identifier associated with the networking device, where the second identifier is a code corresponding to an error condition concatenated to the first identifier. For example, if the first identifier for the networking device is "CurrentSSID" and the client device 200 finds the identifier "CurrentSSID_Error", the client device 200 may determine that an error condition exists for the networking device. For example, if a WAP is experiencing issues with providing an Internet connection, the client device 200 may find the identifier "CurrentSSID_NoInternet" transmitted by the WAP. Similarly, if a wireless printer is low on ink or out of paper, the client device 200 may find the identifier "CurrentSSID_LowInk" or "CurrentSSID_NoPaper", respectively, transmitted by the printer. With this information, the client device 200 may then be able to take corrective action to resolve the error condition at the networking device in order to remove the error condition (e.g., replacing ink cartridge or adding paper), or find another networking device (e.g., another networking device that offers an Internet connection), as will be further described.

Instructions to decrease priority (212) represent program instructions that when executed by the processor 202 cause the client device 200, if the error condition exists, to decrease a priority of the networking device on a client priority scan list, relative to other networking devices for subsequent scans. This may be particularly useful when a user is not able to take any corrective action to fix the error condition. For example, if a first WAP at a particular location is not able to provide an Internet connection (e.g., due to a network outage), the priority of the first WAP may be lowered relative to other WAPs for subsequent scans. As a result, when the client device 200 returns to the particular location, the client device 200 may connect to another WAP besides the first WAP, providing a greater likelihood of the client device 200 finding an Internet connection with the other WAP.

Upon decreasing the priority of the networking device on the client priority scan list, the amount of time that the networking device remains lower on the list may vary. For example, the priority of the networking device may be restored to its original position on the client priority scan list after a fixed period of time (e.g., 2 hours or 24 hours). However, the priority of the networking device on the client priority scan list may remain lower indefinitely, and be increased only after determining the error condition at the networking device no longer exists. As an example, this may be determined by the client device 200 manually accessing the networking device to determine whether the error condition exists. Modifying the priority of the networking device on the client priority scan list may be automated as well, with the client device 200 increasing the priority of the networking device upon no longer finding an identifier of the networking device with a code corresponding to the error condition concatenated to the identifier, as described above.

Figure 3:
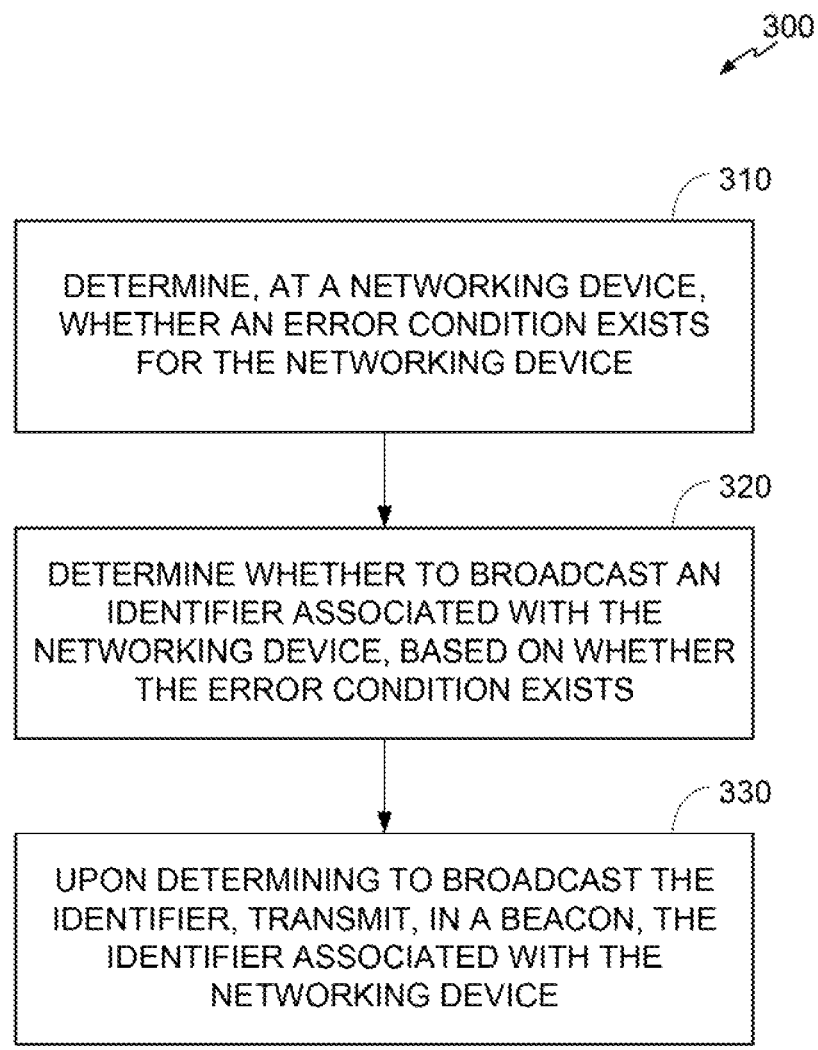
FIGS. 3-4 are flow diagrams in accordance with examples of the present disclosure.

FIG. 3 is a flow diagram 300 of steps taken by a networking device to implement a method for handling error conditions, according to an example. As described above, the networking device may correspond to a WAP that offers an Internet connection, a printer that offers wireless printing, a camera for wirelessly capturing images, or a network-attached storage for offering wireless backup, among others. In discussing FIG. 3, reference may be made to the example networking device 100 illustrated in FIG. 1. Such reference is made to provide contextual examples and not to limit the manner in which the method depicted by FIG. 3 may be implemented.

At 310, the networking device may determine whether an error condition exists for the networking device. As described above, examples of error conditions that may arise for the networking device include, but are not limited to, an Internet connection not being available at a WAP (e.g., due to a network outage), a printer being low on ink or out of paper, or a networking device, such as the network-attached storage, being low on storage space.

At 320, the networking device may determine whether to broadcast an identifier associated with the networking device, based on whether the error condition exists. The identifier associated with the networking device may vary. As described above, the identifier may correspond to an SSID of the networking device. For example, if a client device desires to access the Internet connection that may be provided by a WAP, the client device may join the SSID broadcast by the WAP. Similarly, if the client device desires to wirelessly print a document to a printer, the client device may select the SSID broadcast by the wireless printer. As another example of an identifier associated with the networking device, the identifier may correspond to the MAC address of the networking device, which is unique for each networking device in a service area of the client device.

As an example, if the error condition exists, the networking device may determine not to broadcast the identifier. For example, rather than the networking device broadcasting the identifier, and a client device accessing the networking device via the identifier, then coming to know about the error condition, the networking device instead may determine not to broadcast the identifier, allowing for the client device to access another networking device that may not be experiencing an error condition. However, the networking device may also determine to broadcast the identifier, even if the error condition exists, as will be further described.

At 330, the networking device, upon determining to broadcast the identifier, may transmit, in a beacon, the identifier associated with the networking device. As an example, if the error condition exists, the identifier transmitted in the beacon may include a code corresponding to the error condition concatenated to a unique identifier associated with the networking device, as described above. However, if the error condition does not exist, the identifier transmitted in the beacon may not include the code corresponding to the error condition, and only include the unique identifier associated with the networking device.

As an example, regardless of whether the error condition exists, the networking device may transmit in the beacon only the unique identifier associated with the networking device. As a result, upon receiving a request from a client device, the networking device may then provide to the client device a description of the error condition, if any.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

Figure 4:
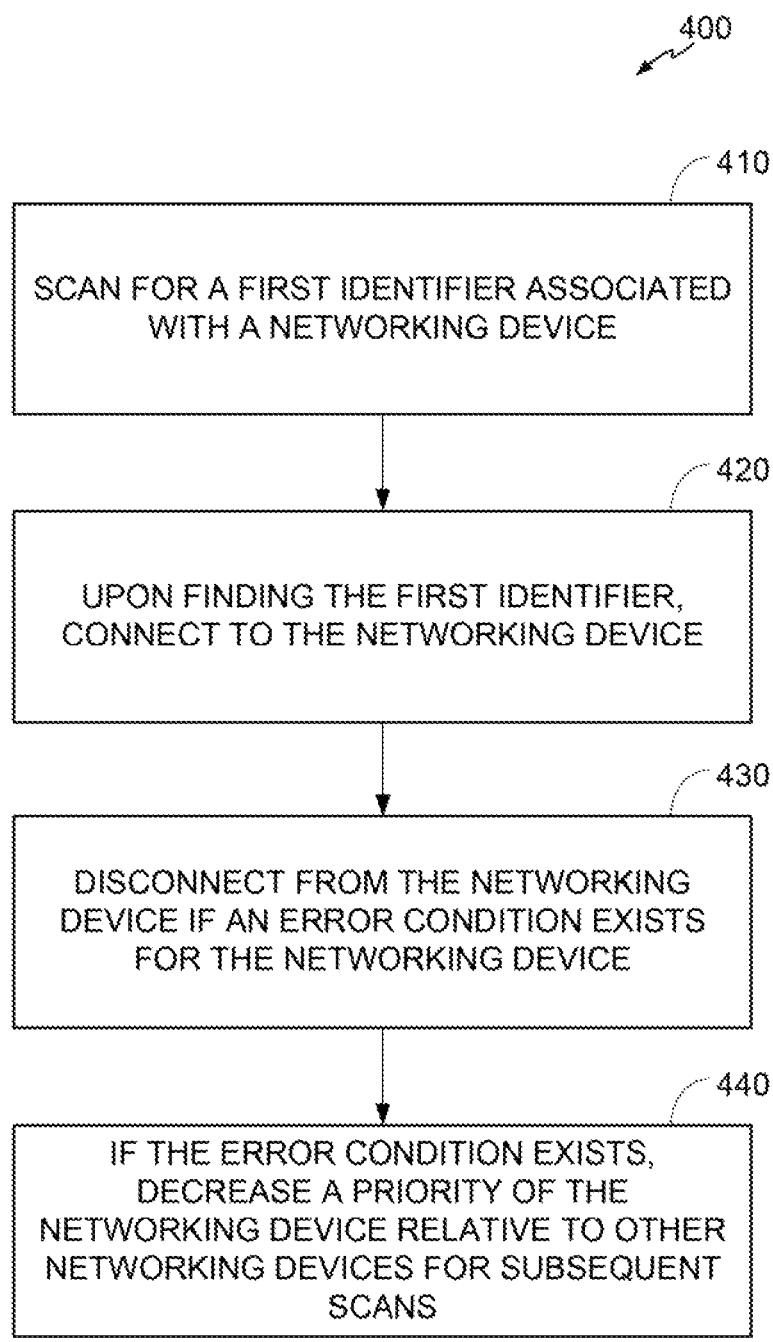

FIG. 4 is a flow diagram 400 of steps taken by a client device to implement a method for handling error conditions at a networking device, according to an example. In discussing FIG. 4, reference may be made to the example client device 200 illustrated in FIG. 2. Such reference is made to provide contextual examples and not to limit the manner in which the method depicted by FIG. 4 may be implemented.

At 410, the client device may scan for a first identifier associated with a networking device. As an example, the first identifier may correspond to an SSID of the networking device, as described above. For example, if the client device desires to access the Internet connection that may be provided by a WAP, the client device may join the SSID broadcast by the WAP. As another example of an identifier associated with the networking device, the first identifier may correspond to the MAC address of the networking device, which is unique for each networking device in a service area of the client device.

At 420, the client device, upon finding the first identifier, may connect to the networking device. As described above, the networking device may transmit, in a beacon, the first identifier associated with the networking device. Upon the client device detecting the first identifier transmitted by the networking device, the client device and the networking device may initiate communications with each other.

At 430, the client device may disconnect from the networking device if an error condition exists for the networking device. Detection of the error condition for the networking device may vary, as described above. For example, the client device may determine on its own that an error condition exists, or may receive information from the networking device that the error condition exists. As an example, if the first identifier is not found during the scan, the client device may determine whether the first identifier is flagged for the error condition. As an example, the first identifier may be flagged for the error condition if a second identifier associated with the networking device is found, wherein the second identifier is a code corresponding to the error condition concatenated to the first identifier, as described above.

At 440, if the error condition exists, the client device may decrease a priority of the networking device relative to other networking devices for subsequent scans. For example, if a first WAP at a particular location is not able to provide an Internet connection (e.g., due to a network outage), the priority of the first WAP may be lowered relative to other WAPs for subsequent scans. As a result, when the client device returns to the particular location, the client device may connect to another WAP besides the first WAP, providing a greater likelihood of the client device finding an Internet connection with the other WAP.

Upon decreasing the priority of the networking device on the client priority scan list, the amount of time that the networking device remains lower on the list may vary. As an example, the client device may restore the priority of the networking device to its original position after a fixed period of time. However, the client device may also only increase the priority of the networking device only upon determining the error condition no longer exists.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
scanning, at a first time, for a first identifier associated with a networking device, the networking device identified in a scan priority list having a higher priority than a second networking device;
upon finding the first identifier, connecting to the networking device; disconnecting from the networking device responsive to detection of an error condition existing for the networking device; and
responsive to detection of the error condition, decreasing the priority of the networking device in the scan priority list to be lower than other networking devices including at least the second networking device for subsequent scans to be performed at a second time to cause the other network devices to be scanned for at the second time prior to scanning for the networking device.

2. The method of claim 1, comprising restoring the priority of the networking device to its previously held priority prior to the decreasing after a fixed period of time.

3. The method of claim 1, comprising increasing the priority of the networking device responsive to determining the error condition no longer exists.

4. The method of claim 1, comprising:
  determining whether the first identifier is flagged for the error condition responsive to the first identifier not being found during the scan; and
  decreasing the priority of the networking device relative to the other networking devices for subsequent scans responsive to the first identifier being flagged for the error condition.

5. The method of claim 4, wherein the first identifier is flagged for the error condition responsive to a second identifier associated with the networking device being found, wherein the second identifier is a code corresponding to the error condition concatenated to the first identifier.

6. A non-transitory computer-readable storage medium comprising program instructions which, when executed by a processor, cause the processor to:
  scan, at a first time, for a first identifier associated with a networking device, the networking device identified in a scan priority list having a higher priority than a second networking device;
  upon finding the first identifier, connect to the networking device;
  disconnect from the networking device responsive to detection of an error condition existing for the networking device;
  responsive to detection of the error condition, decrease the priority of the networking device in the scan priority list to be lower than other networking devices including at least the second networking device for subsequent scans to be performed at a second time to cause the other network devices to be scanned for at the second time prior to scanning for the networking device; and determine whether to restore the priority of the networking device.

7. The non-transitory computer-readable storage medium of claim 6, wherein the instruction to determine whether to restore the priority of the networking device which, when executed by the processor, to cause the processor to restore the priority of the networking device to its original position after a fixed period of time.

8. The non-transitory computer-readable storage medium of claim 6, wherein the instruction to determine whether to restore the priority of the networking device which, when executed by the processor, to cause the processor to increase the priority of the networking device upon determining the error condition no longer exists.

9. The non-transitory computer-readable storage medium of claim 6, comprising program instructions which, when executed by the processor, cause the processor to:
  determine whether the first identifier is flagged for the error condition responsive to the first identifier not being found during the scan; and
  decrease the priority of the networking device relative to the other networking devices for subsequent scans responsive to the first identifier being flagged for the error condition.

10. The non-transitory computer-readable storage medium of claim 9, wherein the first identifier is flagged for the error condition responsive to a second identifier associated with the networking device being found, wherein the second identifier is a code corresponding to the error condition concatenated to the first identifier.

* * * * *